(No Model.)

G. H. GREGORY.
GAS BURNER.

No. 363,892. Patented May 31, 1887.

Witnesses
James D. Griswold
Charles T. Ward

Inventor
George H. Gregory
by his attorneys
Gifford & Brown

UNITED STATES PATENT OFFICE.

GEORGE H. GREGORY, OF BROOKLYN, NEW YORK.

GAS-BURNER.

SPECIFICATION forming part of Letters Patent No. 363,892, dated May 31, 1887.

Application filed March 15, 1886. Serial No. 195,251. (No model.)

*To all whom it may concern:*

Be it known that I, GEORGE H. GREGORY, of Brooklyn, in the county of Kings and State of New York, have invented a certain new and useful Improvement in Gas-Burners, of which the following is a specification.

I will describe in detail a gas-burner embodying my improvement, and then point out the novel features in the claims.

Figure 1:
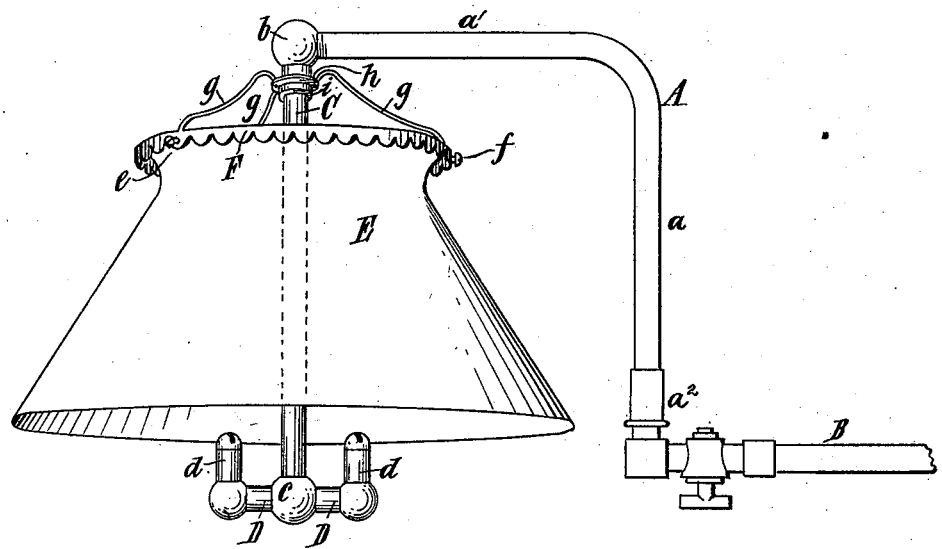
Figure 2:
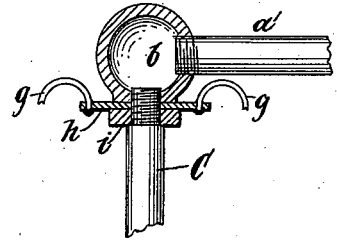

In the accompanying drawings, Figure 1 illustrates a lamp-burner embodying my improvement. Fig. 2 is a detail of certain parts.

Similar letters of reference designate corresponding parts in both figures.

A designates a supply-pipe in the example of my improvement shown. This pipe is bent so as to form two portions, $a\ a'$, extending at approximate right angles to each other. One of the portions is provided at its end with a coupling-piece, $a^2$, whereby it may be secured to the nipple of an ordinary gas-fixture, B, of which I have shown but a portion in the drawings. When so secured to the gas-fixture, the portion $a$ extends vertically and the portion $a'$ horizontally. Coupled to the end of the portion $a'$ is a section of gas-pipe, C. Preferably the coupling will be accomplished by screw-threading the upper end of the pipe C and inserting it in a screw-threaded aperture in a bulb-like coupling-piece, $b$, at the extremity of the portion $a'$ of the pipe A. The pipe C extends downwardly at approximate right angles to said portion $a'$ and approximately parallel with the portion $a$ of the pipe A. The lower extremity of the pipe C is provided with a coupling-piece, $c$, into which are screw-threaded short pipes D, extended at approximate right angles to the pipe C. I have shown but two of the pipes D; but any suitable number may be used. The outer ends of the pipes D are provided with suitable coupling-pieces, from which extend upwardly burner-tips $d$.

E designates a shade, which may be made of porcelain or other suitable material. This shade is supported wholly from its upper edge, upon which it is provided with a flange, $e$, with which is engaged a shade-ring, F, by means of screws $f$, or in any other suitable manner. The shade-ring comprises arms $g$ and a ring, $h$. The ring $h$ surrounds the tube C near the upper end of the latter, and is supported thereby. I prefer to so support it by means of a ring, $i$, screw-threaded onto the upper end of the pipe C, so as to form a flange or shoulder, upon which the ring $h$ may rest. When the pipe C is screwed into the coupling-piece $b$, the ring $h$ is firmly secured between said coupling-piece and the ring $i$. Of course the ring $i$ may be rigid on the pipe C, if desirable. I have shown the shade E as flaring; but it may be of other shape, if desirable.

I do not wish to limit myself to the precise shape of the pipe A shown, as the same may be varied, except that I deem it essential that a portion of the pipe A shall extend at approximate angles to the pipe C above the burner.

It will be observed that the burner-tips $d$ are arranged quite close to the pipe C. The escaping products of combustion therefore heat the pipe C very hot, as well as the rectangular joint formed by the pipes C and A and a portion of the pipe A. This is highly advantageous, because gas becomes very highly heated before reaching the burner-tips, which results in perfect combustion of the gas with a very white flame. It will be seen, also, by my improvement that but a slight shadow will be cast downwardly by the burner, as there is little to obstruct the direct ray of light.

This burner is very compact, cheap, and durable, and may be readily affixed to any gas-fixture.

What I claim as my invention, and desire to secure by Letters Patent, is—

1. A gas-burner adapted for use with a horizontally-extending arm of a gas-fixture, to be detachably secured thereto, comprising a pipe having an upwardly-extending portion and a portion extending in a horizontal direction therefrom, a pipe extending downwardly from the last-mentioned portion, with a pipe at the lower extremity of the downwardly-extending portion, an upwardly-extending burner-tip attached to the last-named pipe, a shade surrounding the downwardly-extending pipe, and a support for the same.

2. A gas-burner adapted for use with a horizontally-extending arm of a gas-fixture, and to be detachably secured thereto, comprising a pipe, as A, having an upwardly-extending portion and a portion extending in a horizontal direction therefrom, a pipe, as C, extending downwardly from the last-mentioned portion, a pipe, as D, near the lower extremity of the pipe C, an upwardly-extending tip, as $d$, and a shade surrounding the pipe and supported thereby above the burner-tip, substantially as specified.

GEORGE H. GREGORY.

Witnesses:
EDWIN H. BROWN,
JAMES D. GRISWOLD.